US010286821B1

(12) United States Patent
Faruque et al.

(10) Patent No.: US 10,286,821 B1
(45) Date of Patent: May 14, 2019

(54) ARMREST CORE, ARMREST INCORPORATING THAT ARMREST CORE AND METHOD OF MANUFACTURING THAT ARMREST ASSEMBLY

(71) Applicant: FORD GLOBAL TECHNOLOGIES, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 15/791,724

(22) Filed: Oct. 24, 2017

(51) Int. Cl.
*B60J 9/00* (2006.01)
*B60N 2/75* (2018.01)
*B33Y 80/00* (2015.01)
*B33Y 10/00* (2015.01)
*B29C 64/118* (2017.01)

(52) U.S. Cl.
CPC .............. *B60N 2/75* (2018.02); *B33Y 80/00* (2014.12); *B29C 64/118* (2017.08); *B33Y 10/00* (2014.12)

(58) Field of Classification Search
CPC .......... B60N 2/75; B33Y 80/00; B33Y 10/00; B29C 64/118
See application file for complete search history.

(56) References Cited

U.S. PATENT DOCUMENTS

| | | | |
|---|---|---|---|
| 5,290,087 A | | 3/1994 | Spykerman |
| 5,573,272 A | * | 11/1996 | Teshima .............. B60R 21/0428 280/751 |
| 6,142,563 A | | 11/2000 | Townsend et al. |
| 8,172,311 B2 | | 5/2012 | Hughes, Jr. et al. |
| 9,114,773 B2 | | 8/2015 | Sundararajan et al. |
| 9,233,660 B1 | | 1/2016 | Farooq et al. |
| 9,527,261 B1 | * | 12/2016 | Roper ..................... F16L 41/00 |
| 2004/0195064 A1 | | 10/2004 | Tamada et al. |
| 2010/0259069 A1 | * | 10/2010 | Suzuki ................... B60J 5/0451 296/187.12 |
| 2013/0032307 A1 | * | 2/2013 | Line .................... B60H 1/00207 165/41 |
| 2016/0023768 A1 | * | 1/2016 | Tute ........................ B60N 2/70 297/411.46 |

(Continued)

FOREIGN PATENT DOCUMENTS

GB   1137789 A   12/1968
GB   1177122 A   1/1970

OTHER PUBLICATIONS

"Seventh additive manufacturing system for Italian 3D printing service bureau"; Plastics Today; https://www.plasticstoday.com/content/seventh-additive-manufacturing-system-italian-3d-printing-service-bureau/4693295119763; Dec. 15, 2013; pp. 1-2.

*Primary Examiner* — Lori L Lyjak
(74) *Attorney, Agent, or Firm* — Vichit Chea; King & Schickli, PLLC

(57) ABSTRACT

An armrest core includes a lattice having a plurality of void channel clusters. The void channel clusters have a section geometry characterized by a lateral dimension $D_1$ and a vertical dimension $D_2$ where $D_1<D_2$. An armrest assembly includes the armrest core and an outer cover overlying the armrest core. A method of manufacturing the armrest assembly is also disclosed.

14 Claims, 6 Drawing Sheets

(56) References Cited

U.S. PATENT DOCUMENTS

| | | | |
|---|---|---|---|
| 2017/0232872 A1 | 8/2017 | Faruque et al. | |
| 2018/0071979 A1* | 3/2018 | Achten | B33Y 10/00 |
| 2018/0264718 A1* | 9/2018 | McCluskey | B29C 64/124 |
| 2018/0361510 A1* | 12/2018 | Stamp | B22F 3/1055 |

* cited by examiner

ARMREST CORE, ARMREST INCORPORATING THAT ARMREST CORE AND METHOD OF MANUFACTURING THAT ARMREST ASSEMBLY

TECHNICAL FIELD

This document relates generally to the motor vehicle equipment field and, more particularly, to a new and improved armrest core, an armrest assembly incorporating that armrest core and a method of manufacturing that armrest assembly.

BACKGROUND

An armrest for a motor vehicle side door must have substantial strength in the vertical direction to support loads such as a vehicle occupant's arm resting on the armrest. In contrast, an armrest should be yielding to some degree in the lateral direction. More specifically, if the motor vehicle is involved in a side impact collision, there is a possibility that the armrest will strike the vehicle occupant in the rib area. This could be due to the vehicle occupant being thrown against the armrest and/or due to the door bearing the armrest being deflected into the vehicle occupant. In such a situation, if the armrest is too stiff laterally and too unyielding, the potential for injury from vehicle occupant impact with the armrest increases.

This document relates to a new and improved armrest core that fully meets the seemingly conflicting requirements for vertical strength while providing yielding characteristics in the lateral direction. An armrest assembly incorporating the new and improved armrest core and a method of manufacturing that armrest assembly are also provided.

SUMMARY

In accordance with the purposes and benefits described herein, a new and improved armrest core is provided. That armrest core comprises a lattice including a plurality of void channel clusters having a section geometry characterized by a lateral dimension $D_1$ and a vertical dimension $D_2$ where $D_1 < D_2$.

The plurality of void channel clusters may be aligned along a longitudinal axis L of the armrest core wherein the longitudinal axis L is perpendicular to the lateral dimension $D_1$ and the vertical dimension $D_2$. Further, the plurality of void channel clusters may be defined by a plurality of 3D shaped structures selected from a group consisting of skeletal ovoids, skeletal ellipsoids, skeletal polyhedra, skeletal octahedra and combinations thereof. Still further, the armrest core may include a cover skin over at least a portion of the lattice.

In accordance with an additional aspect, a new and improved armrest assembly is provided. That armrest assembly comprises an armrest core having a lattice including a plurality of void channel clusters having a section geometry characterized by a lateral dimension $D_1$ and a vertical dimension $D_2$ where $D_1 < D_2$ and an outer cover overlying the armrest core.

The plurality of void channel clusters forming the lattice of the armrest core may be aligned along a longitudinal axis L of the armrest core wherein the longitudinal axis L is perpendicular to the lateral dimension $D_1$ and the vertical dimension $D_2$. Further, the plurality of void channel clusters may be defined by a plurality of 3D shaped structures selected from a group consisting of skeletal ovoids, skeletal ellipsoids, skeletal polyhedra, skeletal octahedra and combinations thereof. Still further, the armrest core may include a cover skin over at least a portion of the lattice.

In addition, the outer cover covering the armrest core may include a cushion layer and a finish layer concealing the cushion layer.

In accordance with yet another aspect, a method is provided of manufacturing an armrest assembly. That method may be defined as comprising the steps of: (a) creating an armrest core lattice including a plurality of void channel clusters having a section geometry characterized by a lateral dimension $D_1$ and a vertical dimension $D_2$ where $D_1 < D_2$ and (b) covering the armrest core lattice with an outer cover.

Still further, the method may include the step of aligning the plurality of void channel clusters along a longitudinal axis L of the armrest core lattice. That longitudinal axis L may be provided perpendicular to the lateral dimension $D_1$ and the vertical dimension $D_2$.

The step of creating the armrest core lattice may include extruding, with an additive manufacturing device, a plurality of interconnected 3D shaped structures. More specifically, the step of creating the armrest core lattice may include the step of extruding, with an additive manufacturing device, a plurality of 3D shaped structures selected from a group consisting of skeletal ovoids, skeletal ellipsoids, skeletal polyhedra, skeletal octahedra and combinations thereof.

In the following description, there are shown and described several preferred embodiments of the armrest core, the armrest assembly incorporating that armrest core and the method of manufacturing that armrest assembly. As it should be realized, the armrest core, the armrest assembly and the manufacturing method are capable of other, different embodiments and their several details are capable of modification in various, obvious aspects all without departing from the armrest core, armrest assembly and manufacturing method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the armrest core, the armrest assembly incorporating that armrest core and the method of manufacturing the armrest assembly and together with the description serve to explain certain principles thereof.

Reference will now be made in detail to the present preferred embodiments of the armrest core, arm reset assembly incorporating that armrest core and the method of manufacturing that armrest assembly, examples of which are illustrated in the accompanying drawing figures.

DETAILED DESCRIPTION

Figure 1:
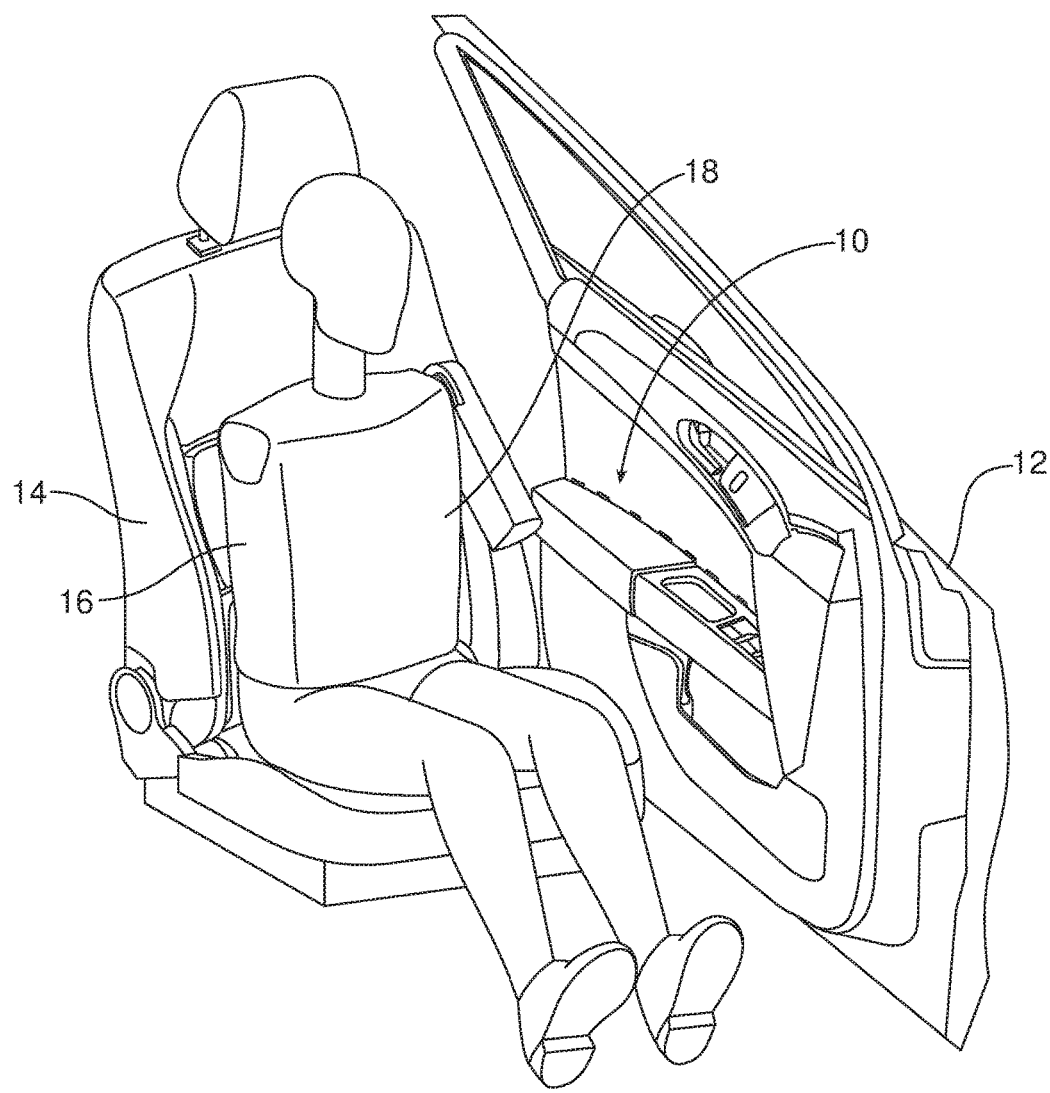
FIG. 1 is a perspective view illustrating the new and improved armrest assembly carried on a side door of a motor vehicle and the spatial relationship of that armrest assembly to an operator of the motor vehicle sitting in the driver's seat.

Reference is now made to FIG. 1 illustrating a new and improved armrest assembly 10. As illustrated in FIG. 1, the armrest assembly 10 is mounted to or carried on a side door 12 of a motor vehicle. That door 12 may be opened to allow access to the motor vehicle seat such as the driver's seat 14.

The crash test dummy 16 illustrated in the driver's seat 14 is representative of the position of a driver when operating the motor vehicle. As should be appreciated, the armrest assembly 10 on the side door 12 is located a short lateral distance from the rib area 18. In the event of a side impact collision, the armrest assembly 10 may contact the rib area 18 and should yield to cushion the blow and protect the driver.

Figure 2:
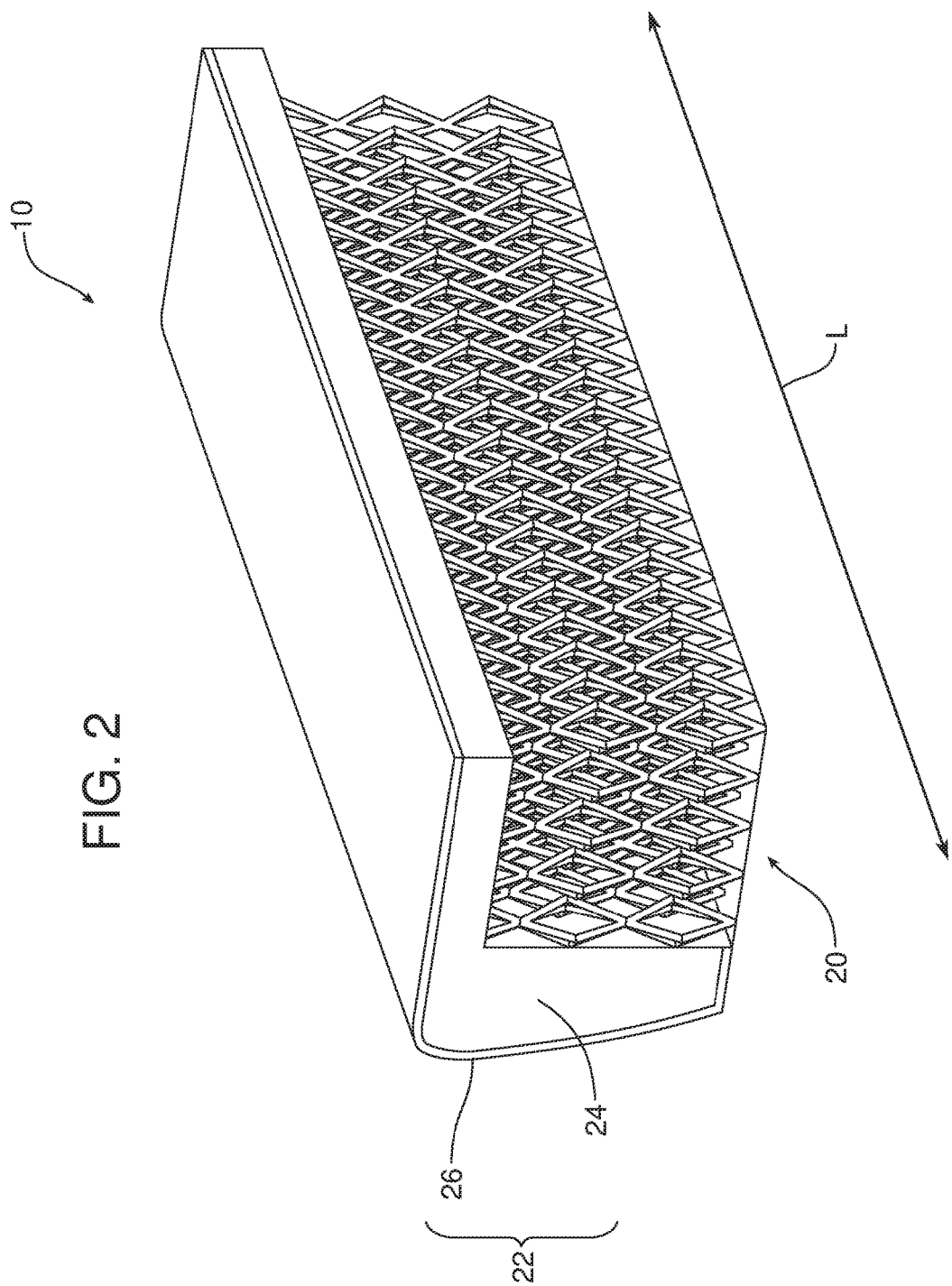
FIG. 2 is a detailed perspective view of a completed armrest assembly incorporating an armrest core, having a lattice, and an outer cover overlying that armrest core.

As best illustrated in FIG. 2, the armrest assembly 10 comprises an armrest core, generally designated by reference numeral 20, and an outer cover 22 overlying the armrest core. In the illustrated embodiment, the outer cover 22 includes a cushion layer 24 and a finish layer 26 concealing the cushion layer. The cushion layer 24 may be made from any appropriate material including, for example, cellular foam, leather, fabric or the like.

Figure 3A:
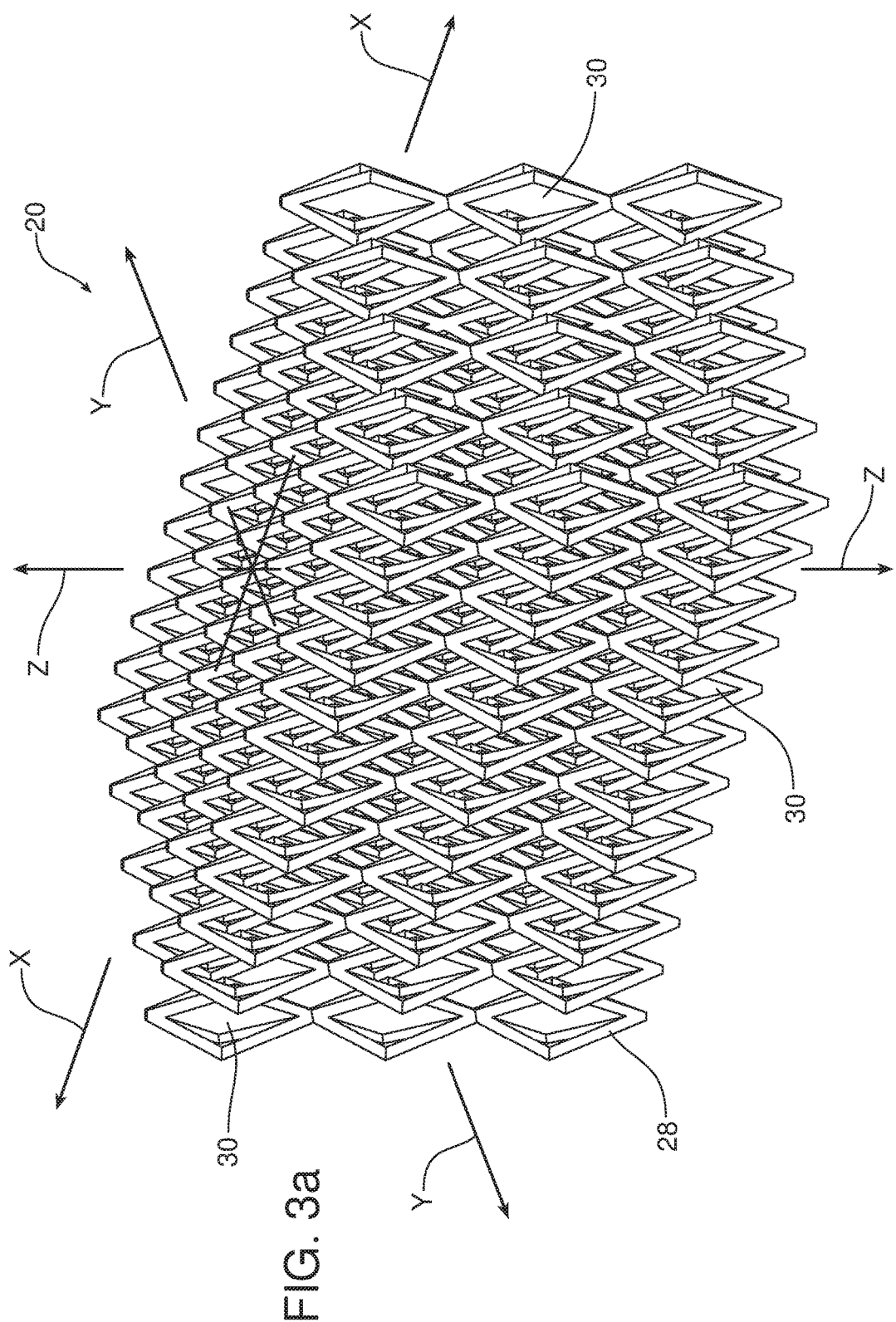
FIG. 3a is a detailed perspective view of a portion of an armrest core lattice including a plurality of void channel clusters with a particular section geometry as defined by a plurality of interconnected 3D shaped structures.
Figure 3B:
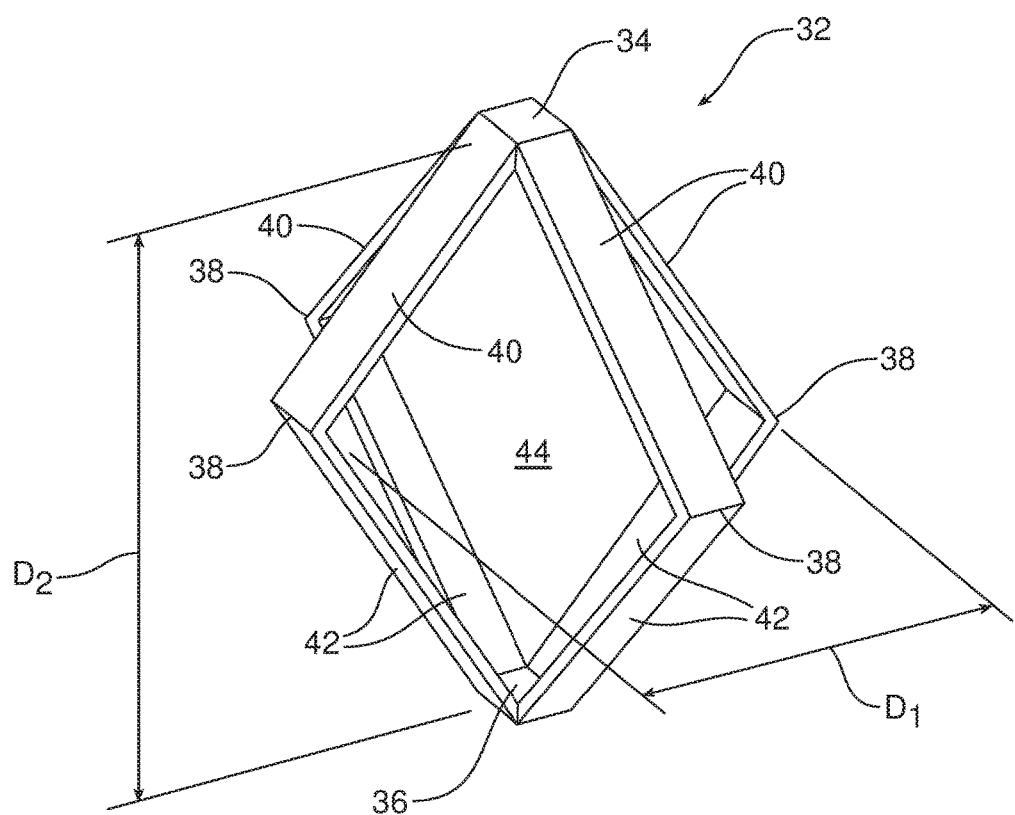
FIG. 3b is a detailed perspective view of one possible embodiment of such a 3D shaped structure in the form of a skeletal octahedra.

As best illustrated in FIGS. 3a and 3b, the armrest core 20 includes a lattice 28 having a plurality of void channel clusters 30. Those void channel clusters 30 have a section geometry characterized by a lateral dimension $D_1$ and a vertical dimension $D_2$ where where $D_1 < D_2$ (see FIG. 3b).

As further illustrated in FIGS. 3a and 3b, the plurality of void channel clusters 30 are aligned along a longitudinal axis L of the armrest core 20. That longitudinal axis L is perpendicular to the lateral dimension $D_1$ and a vertical dimension $D_2$. More specifically, when installed on the side door 12 of a motor vehicle and that side door 12 is in the closed position as illustrated in FIG. 1, the longitudinal axis L, the lateral dimension $D_1$ and a vertical dimension $D_2$ correspond respectively to the longitudinal axis X, the lateral axis Y and the vertical axis Z of the SAE vehicle axis system (see FIG. 3a).

As best illustrated in FIGS. 3a and 3b, the plurality of void channel clusters 30 are defined by a plurality of 3D shaped structures 32. Those 3D shaped structures 32 may be selected from a group of structures consisting of skeletal ovoids, skeletal ellipsoids, skeletal polyhedra, skeletal octahedra and combinations thereof.

FIG. 3b illustrates a single 3D shaped structure 32 having a skeletal octahedra configuration. More specifically, each 3D shaped structure in the form of a skeletal octahedra includes a single vertex 34 at a first end, a single vertex 36 at a second end and four vertices 38 lying in a single mid plane between the two ends. A first set of ribs 40 connect the vertex 34 to the mid plane vertices 38, and a second set of ribs 42 connect the vertex 36 to the mid plane vertices 38. Together, the ribs 40, 42 define the skeletal 3D shaped structure of the octahedra outlining the interior void 44.

As should be appreciated, the vertical dimension $D_2$ of the section geometry of the void channel clusters 30 is defined by the distance from the vertex 34 at the first end to the vertex 36 at the second end of the 3D shaped structure 32. The lateral dimension $D_1$ of the section geometry of the void channel clusters 30 is defined by the distance between the two opposed vertices 38 lying in the mid plane along the lateral axis Y. The longer vertical dimension $D_2$ provides the lattice 28 with greater strength in the vertical direction while the shorter lateral dimension $D_1$ provides lower strength and more yielding characteristics in the lateral direction to help protect a driver from rib injury in the event of a side impact collision.

Figure 3C:
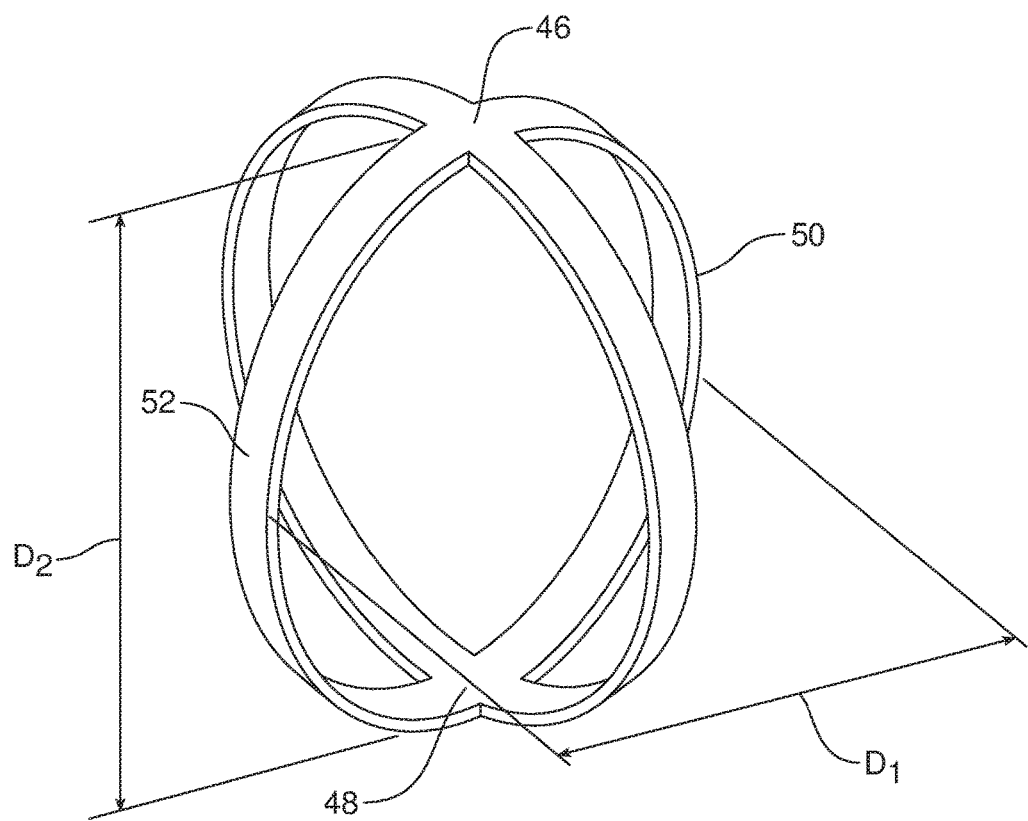
FIG. 3c is a view similar to FIG. 2b but illustrating a second possible embodiment wherein the 3D shaped structure is a skeletal ovoid.

FIG. 3c illustrates an alternative embodiment wherein the 3D shaped structure 32 providing the void channel clusters 30 comprises a skeletal ovoid including a first end vertex 46 and a second end vertex 48 defining the greater and stronger vertical dimension $D_2$ and mid line vertices 50, 52 where one skeletal ovoid is connected to others to define the more yielding lateral dimension $D_1$.

Figure 4:
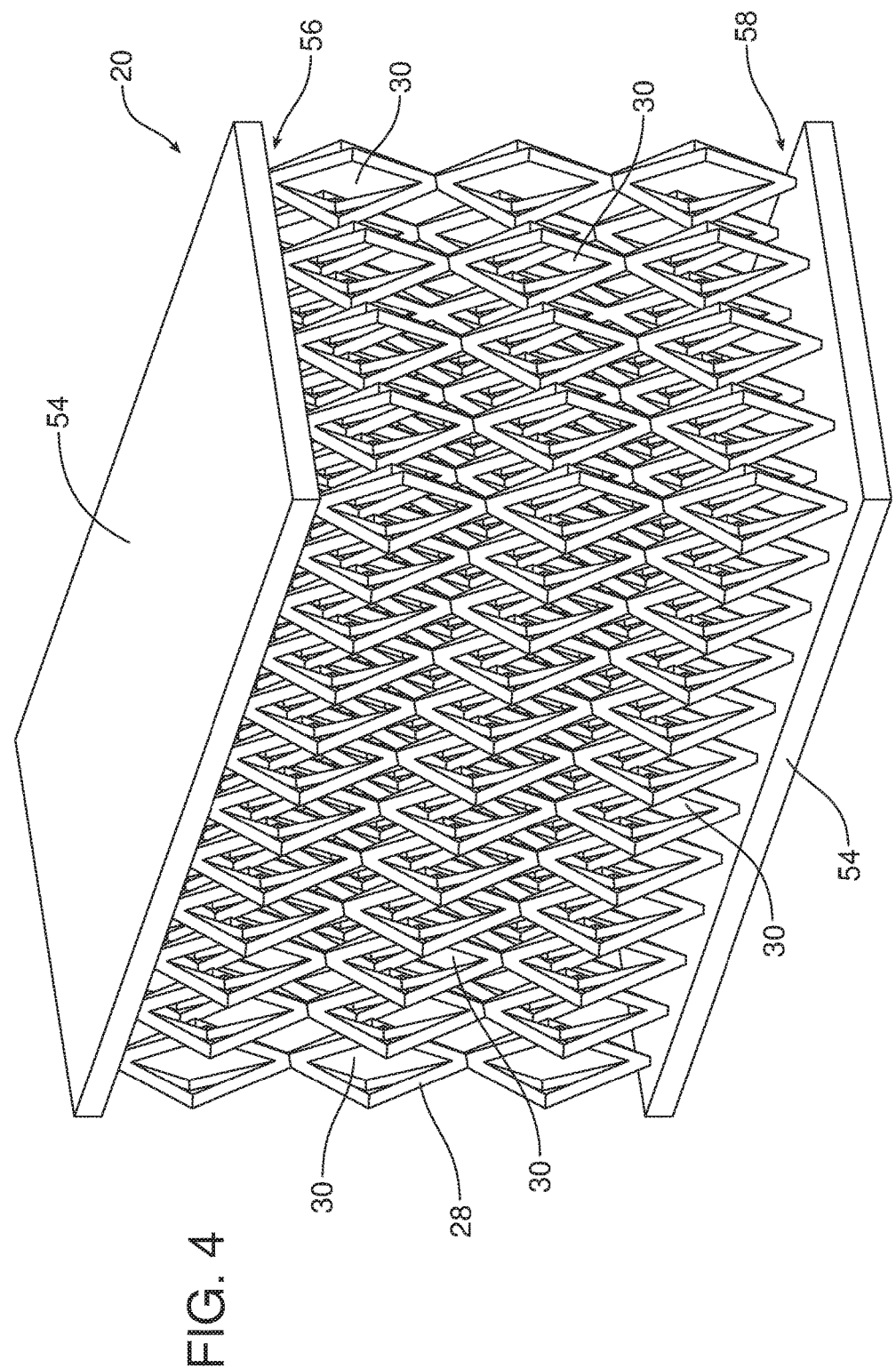
FIG. 4 is a detailed perspective view of a portion of an armrest core lattice incorporating a cover skin over the upper surface and the lower surface of that lattice.

As illustrated in FIG. 4, the armrest core 20 may also include a cover skin 54 over at least a portion of the lattice 28. That cover skin 54 may be integrally formed as a single piece with the lattice 28. In the illustrated embodiment the cover skin 54 extends across and covers the first or top end 56 and the second or lower end 58 of the lattice 28. In this configuration, the cover skin 54 functions to support and stabilize the various 3D shaped structures 32 of the lattice 28 along the first and second ends of the lattice in an orderly, equally spaced orientation. As will be apparent from the following description, the cover skin 54 also aids in the manufacture of the armrest assembly 10.

The armrest assembly 10 may be manufactured in a very efficient and effective manner. More specifically, the method of manufacturing the armrest assembly 10 includes the steps of creating the armrest core lattice 28, including the plurality of void channel clusters 30 having a section geometry characterized by a lateral dimension $D_1$ and a vertical dimension $D_2$ where $D_1 < D_2$. Further, the method includes the step of covering that armrest core lattice 28 with an outer cover 22 including a cushion layer 24 and a finish layer 26.

More specifically, in the illustrated embodiment, the method includes the step of aligning the plurality of void channel clusters 30 along a longitudinal axis L of the armrest core lattice 28 wherein the longitudinal axis L is perpendicular to the lateral dimension $D_1$ and the vertical dimension $D_2$ (see FIG. 3a). In one particularly useful embodiment of the method, the method includes the step of creating the armrest core lattice 28 by extruding, with an additive manufacturing device, the plurality of 3D shaped structures 32 that form the lattice. Those 3D shaped structures may be selected from a group of structures consisting of skeletal ovoids, skeletal ellipsoids, skeletal polyhedra, skeletal octahedra and combinations thereof. In other possible embodiments, the method may also include the step of extruding, with the additive manufacturing device, the cover skin 54 along any side or end of the lattice 28 thereby creating a lattice 28 with an integrally molded cover skin 54.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An armrest core, comprising:
a lattice including a plurality of void channel clusters having a section geometry characterized by a lateral dimension $D_1$ and a vertical dimension $D_2$ where $D_1<D_2$.

2. The armrest core of claim 1, wherein said plurality of void channel clusters are aligned along a longitudinal axis L of said armrest core wherein said longitudinal axis L is perpendicular to said lateral dimension $D_1$ and said vertical dimension $D_2$.

3. The armrest core of claim 2, wherein said plurality of void channel clusters are defined by a plurality of 3D shaped structures selected from a group consisting of skeletal ovoids, skeletal ellipsoids, skeletal polyhedra, skeletal octahedra and combinations thereof.

4. The armrest core of claim 3, further including a cover skin over at least a portion of said lattice.

5. An armrest assembly, comprising:
an armrest core having a lattice including a plurality of void channel clusters having a section geometry characterized by a lateral dimension $D_1$ and a vertical dimension $D_2$ where $D_1<D_2$; and
an outer cover overlying said armrest core.

6. The armrest assembly of claim 5, wherein said plurality of void channel clusters are aligned along a longitudinal axis of said armrest core wherein said longitudinal axis is perpendicular to said lateral dimension $D_1$ and said vertical dimension $D_2$.

7. The armrest assembly of claim 6, wherein said plurality of void channel clusters are defined by a plurality of 3D shaped structures selected from a group consisting of skeletal ovoids, skeletal ellipsoids, skeletal polyhedra, skeletal octahedra and combinations thereof.

8. The armrest assembly of claim 7, further including a cover skin over at least a portion of said lattice.

9. The armrest assembly of claim 7, wherein said outer cover includes a cushion layer and a finish layer concealing said cushion layer.

10. A method of manufacturing an armrest assembly, comprising:
creating an armrest core lattice including a plurality of void channel clusters having a section geometry characterized by a lateral dimension $D_1$ and a vertical dimension $D_2$ where $D_1<D_2$; and
covering said armrest core lattice with an outer cover.

11. The method of claim 10, further including aligning said plurality of void channel clusters along a longitudinal axis L of said armrest core lattice wherein said longitudinal axis L is perpendicular to said lateral dimension $D_1$ and said vertical dimension $D_2$.

12. The method of claim 11, wherein said creating of said armrest core lattice includes extruding, with an additive manufacturing device, a plurality of interconnected 3D shaped structures.

13. The method of claim 11, wherein said creating of said armrest core lattice includes extruding, with an additive manufacturing device, a plurality of 3D shaped structures selected from a group consisting of skeletal ovoids, skeletal ellipsoids, skeletal polyhedra, skeletal octahedra and combinations thereof.

14. The method of claim 13, further including extending, by said additive manufacturing device, a cover skin over at least a portion of said armrest core lattice.

* * * * *